Patented Apr. 11, 1950

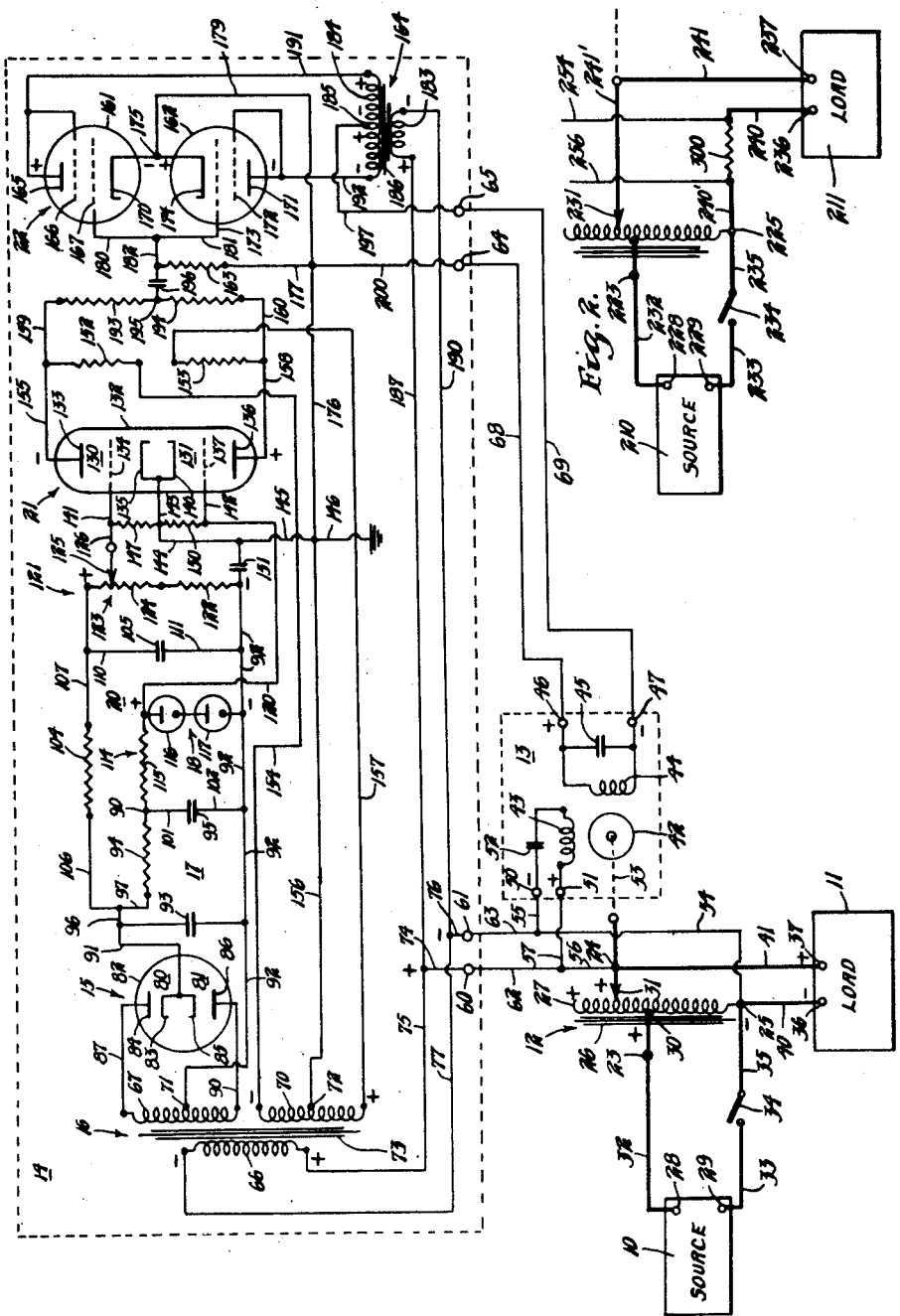

2,504,017

UNITED STATES PATENT OFFICE 2,504,017

ELECTRICAL REGULATOR

Nils N. George and Raymond V. Kline, Minneapolis, Minn., assignors to Minneapolis-Honeywell Regulator Company, Minneapolis, Minn., a corporation of Delaware Application September 19, 1945, Serial No. 617,258

3 Claims. (Cl. 323—47)

This invention relates to the field of electrical regulators, and more particularly to such regulators in which a factor, such for example as the voltage, of the electrical energization of a load circuit is maintained constant regardless of change in the magnitude of the load or variation in the source of electrical energy.

It is an object of this invention to provide a voltage regulator which is accurate and dependable, and which embodies no delicate moving parts.

It is a further object of our invention to provide such a regulator in which voltage is delivered to a load from a source through a control member which is so actuated that the voltage actually delivered to the load is maintained at a predetermined value regardless of change in the voltage of the source or in the magnitude of the load.

Various other objects, advantages, and features of novelty which characterize our invention are pointed out with particularity in the claims annexed hereto and forming a part hereof. However, for a better understanding of the invention, its advantages, and objects attained by its use, reference should be had to the subjoined drawing, which forms a further part hereof, and to the accompanying descriptive matter, in which we have illustrated and described a preferred embodiment of our invention. In the drawing, Figure 1 is a schematic wiring diagram of a voltage regulator embodying our invention, and Figure 2 is a fragmentary modification of Figure 1 showing the invention modified for regulating current rather than regulating voltage.

Referring now to Figure 1, it will be seen that alternating voltage from a source 10 is transmitted to a load 11 through a controller 12 mechanically actuated by a motor 13 whose energization in turn is controlled by a regulator 14 in such a fashion as to maintain the voltage supplied to load 11 at a constant value regardless of variations in the voltage of source 10 and in the load 11. Regulator 14 is energized from controller 12, and in the regulator a rectifier 15 energized through a transformer 16 supplies half wave voltage to a pair of filters 17 and 20. A fixed portion of the output voltage of one of the filters is electronically regulated, and compared with an unregulated, adjustable portion of the output of the other filter. Voltages proportional to the output voltages of the filters appear as voltage drops across the input resistors of a grid controlled rectifier stage generally indicated at 21, whose plates are energized from transformer 16. Any unbalance in the grid controlled rectifier stage appears as a voltage impressed upon the input of a discriminator stage 22 whose plate circuit is also energized from the output of controller 12 and which controls the energization of motor 13 to adjust the voltage output from controller 12 in accordance with the magnitude and sense of the unbalance.

Proceeding now to a detailed consideration of the circuit elements and connections going to make up our invention, element 10 may be any suitable source of alternating voltage of the desired frequency and phase: the time-phase relationship of this voltage serves as a basis for comparison in determining questions of phase throughout the circuit, and an indication of phase relations in the circuit is given by signs indicating points of the same instantaneous polarity. Member 10 may be an alternator, a transformer, an inverter, or the conventional outlet for commercially distributed alternating current. In a preferred embodiment of our invention, source 10 comprises a 400 cycle inverter energized, as is customary in aircraft applications, from the storage batteries and direct current generator of the craft.

Controller 12 is shown as a variable auto-transformer having an input terminal 23, an output terminal 24, and a common terminal 25. The transformer comprises a core 26 carrying a winding 27 which is provided with a fixed tap 30 and a movable slider 31. One end of winding 27 is connected to terminal 25, tap 30 is connected to terminal 23, and slider 31 is connected to terminal 24, all as shown. Devices of this nature are well known, one familiar form being supplied by the General Radio Company under the trade name "Variac." The input of controller 12 is energized from source 10 through conductor 32, and through conductor 33, switch 34, and conductor 35.

Load 11 may be any type of inductive or non-inductive load such as lighting units, electroplating tanks, and so forth, and is shown as having input terminals 36 and 37. In the preferred embodiment of our invention referred to, load 11 comprises electronic control equipment for the craft. Input terminal 36 of load 11 is connected to terminal 25 of control device 12 by conductor 40. Input terminal 37 of load 11 is connected to output terminal 24 of control device 12 by conductor 41.

Motor 13 is shown as a capacitor motor having a rotor 42 and a pair of field windings 43 and 44. A capacitor 45 is connected in parallel with field winding 44, and the parallel combination is connected to a first pair of output terminals 46 and 47 for the motor. Field winding 43 is connected to a second pair of terminals 50 and 51, in series with a capacitor 52. The terminals 50 and 51 are, in turn, connected by conductors 54, 55, 56, and 57 to terminals 24 and 25 of transformer 12.

The current in coil 43 leads the output voltage of transformer 12, which is impressed across the series circuit, by 90 degrees. If current in phase with the output voltage of transformer 12, flows in coil 44, motor 13 operates in a first direction, while if the current in coil 44 is of the opposite phase, the motor operates in the opposite direction, as is well known to those skilled in the art.

Rotor 42 is connected to actuate adjustable tap 31 of control device 12 by a suitable connecting means 53, which may include a gear reduction train if desired. Operation of motor 13 in the first or forward direction is effective to increase the output voltage of transformer 12, while the operation of the motor in the reverse direction decreases the output voltage of the transformer.

From the foregoing, it follows that energization of load 11 from source 10 is controlled by the position of sliding contact 31 of control member 12, and that the position of the sliding member is in turn controlled by operation of motor 13. The means whereby operation of motor 13 is controlled is comprised in regulating circuit 14 which will now be described.

Regulator 14 is provided with a pair of input terminals 60 and 61, energized from terminals 24 and 25 of control device 12 through conductors 56 and 62 and conductors 54 and 63. Regulator 14 is also provided with a pair of output terminals 64 and 65, which are connected to terminals 46 and 47 of motor 13 by conductors 68 and 69.

Transformer 16 is shown to comprise a core 73 carrying a primary winding 66 and a pair of secondary windings 67 and 70 having center taps 71 and 72, respectively. Primary winding 66 is energized from input terminals 60 and 61 by conductors 74 and 75 and conductors 76 and 77. The transformer is so connected that when terminal 23 of transformer 12 is positive with respect to terminal 25 the lower terminal of winding 70 is positive with respect to the upper terminal, instantaneous polarities being indicated in the drawing.

Rectifier 15 is shown to comprise a pair of diodes 80 and 81 contained in a common envelope 82. Diode 80 comprises a cathode 83 and an anode 84: diode 81 similarly comprises a cathode 85 and an anode 86. Anodes 84 and 86 are energized in 180° phase relation from the end terminals of secondary winding 67 of transformer 16 by conductors 87 and 90. Cathodes 83 and 85 are joined within the tube, and are heated indirectly by suitable filament heaters which are not shown. The output from the rectifier is taken from a first conductor 91 connected to the joined cathodes and a second conductor 92 connected to center tap 71 of secondary winding 67.

Filters 17 and 20 are of the resistance-capacitance type, and a capacitor 93 acts as a capacitance-shunt input for both the rectifiers: the capacitor is therefore connected between conductors 91 and 92 as shown.

Filter 17 is shown to comprise a resistor 94 and a capacitor 95 connected in series across the output of the rectifier through a circuit which may be traced from conductor 91 through conductors 96 and 97, resistor 94, conductor 101, capacitor 95, and conductor 102 to conductor 92. Similarly, filter 20 is shown to comprise a resistor 104 and a capacitor 105 connected in series across the output of the rectifier through a circuit which may be traced from conductor 91 through conductors 96 and 106, resistor 104, conductors 107 and 110, capacitor 105, and conductor 111 to conductor 92.

A voltage divider 114 is connected across the output of filter 17, and is shown to comprise a resistor 115 and voltage regulator 18 which in turn comprises a pair of voltage regulator tubes 116 and 117. Due to the well known action of the regulator tubes, a constant voltage is maintained between conductor 92 and the common terminal of regulator 18 and resistor 114: to the common terminal referred to is connected a conductor 120, which is positive with respect to conductor 92.

Across the output of filter 20 is connected a second voltage divider 121 shown to comprise a fixed resistor 122 and a variable resistor 123 having a resistance winding 124 and a contacting slider 125. The voltage drop across this second voltage divider, between slider 125 and conductor 92, differs from that across the first voltage divider in that while the latter remains constant for changes in the output of its filter, the former voltage varies as the output of its filter varies. Of this variable voltage, any desired portion, within the limits of adjustability of variable resistor 123, may be taken off, the magnitude of the portion being determined by the position of slider 125. A conductor 126, connected to slider 125 as shown, is positive with respect to conductor 92.

Rectifier stage 21 comprises a pair of grid controlled rectifiers 130 and 131 which are shown as enclosed in a common envelope 132. Rectifier 130 comprises an anode 133, a grid 134, and a cathode 135. Rectifier 131 comprises an anode 136, a grid 137, and a cathode 140. Cathodes 135 and 140 are indirectly heated by filament heaters which are not shown, and are joined within the tube. Grid 134 is maintained at the potential of conductor 126 by conductor 141, and grid 137 is similarly maintained at the potential of the conductor 120 by conductor 142. Cathodes 135 and 140 are grounded through conductors 143, 144, 145, and 146. A pair of resistors 147 and 150 are connected to serve as the conventional input resistors for the rectifiers. Conductor 92 is grounded through condenser 151 and conductors 145 and 146.

The anodes of the grid controlled rectifiers are energized from secondary winding 70 of transformer 16 through suitable dropping resistors 152 and 153. The anode circuit for rectifier 130 may be traced from the upper terminal of winding 70 through conductor 154, resistor 152, conductor 155, anode 133, cathode 135, and conductors 143, 144, and 145, and 156 to center tap 72 of the transformer winding. Similarly, the anode circuit of rectifier 131 may be traced from the lower terminal of secondary winding 70 through conductor 157, resistor 153, conductor 158, anode 136, cathode 140, and conductors 143, 144, 145, and 156 to the center tap of the transformer winding. From this arrangement it will be evident that the two rectifier anodes are energized in 180 degree phase relationship.

Discriminator stage 22 is shown to comprise a pair of electron discharge devices 161 and 162, an input resistor 163, and an energizing transformer 164. Although triodes function with perfect satisfaction in this circuit, I have found it convenient in the preferred embodiment of our invention to make use of tetrodes, connecting what is normally the screen grid in each tube to its anode to comprise the effective anode of the tube. Thus, electron discharge device 161 comprises an anode 165, a screen grid 166 connected thereto, a control grid 167, and a cathode 170, and electron discharge device 162 comprises an anode 171, a screen grid 172 connected thereto, a control grid 173, and a cathode 174.

It will be observed that the cathodes are connected to a common conductor 175 which in turn is grounded through conductors 179, 176 and 146. One end of input resistor 163 is similarly grounded through conductors 177, 176, and 146.

The grids of tetrodes 161 and 162 are joined by conductors 180 and 181 and connected to the ungrounded end of resistor 163 by conductor 182. A pair of resistors 193 and 194 are connected in series between anode 133 of triode 130 and anode 136 of triode 131, and between the common terminal 195 of these two resistors and the grid conductor 182 of the discriminator stage is connected a suitable coupling capacitor 196.

Transformer 164 is shown to comprise a core 186 carrying a primary winding 183 and a secondary winding 184 having a center tap 185. Primary winding 183 is energized from input terminals 60 and 61 of regulator 14 through conductors 74 and 187 and conductors 76 and 190. The effective anodes of tetrodes 161 and 162 are energized from secondary winding 184 through conductors 191 and 192, respectively. Center tap 185 of secondary winding 184 is connected to output terminal 65 of regulator 14 by conductor 197, while output terminal 64 of regulator 14 is grounded through conductors 200, 176, and 146. The input to discriminator stage 22 may thus be said to comprise a normally balanced network energized in secondary winding 70 and comprising resistors 152 and 153 in parallel with the plate resistances of triodes 130 and 131, the latter being determined by the voltages in the grids of the triodes.

*Operation*

The operation of our invention will now be set forth. Upon closing switch 34, the voltage derived from source 10 is impressed upon transformer 12, and by transformer action a voltage appears between slider 31 and fixed terminal 25 of the transformer and is transmitted to load 11 through conductors 40 and 41. As will readily be apparent to those skilled in the art, the voltage made available to load 11 is related to the voltage impressed on the input of the transformer in the same fashion as is the number of turns between terminals 23 and 25 to the number of turns between slider 31 and terminal 25. That is to say, when slider 31 is above tap 23 in the drawing, the voltage supplied to load 11 is greater than that supplied from source 10, while when the slider is below the tap, the voltage supplied to the load is less than the voltage derived from the source.

Transformer 12 not only energizes load 11, but also provides energy for regulator 14 and for one winding of motor 13. The voltage between slider 31 and terminal 25 is in phase with the voltage between tap 23 and terminal 25 and the following voltages are of the same phase: the voltage between terminals 51 and 50 of winding 43 of motor 13, the voltage between the lower and upper terminals of primary winding 66, and the voltage between the left and right terminals of primary winding 183. The voltage between terminals 37 and 36 of load 11 is also of the same phase although ordinarily the nature of load 11 is such that this phase relation is not of significance.

The current through winding 43 also flows through capacitor 52, and the electrical characteristics of the winding and the capacitor are so chosen that the combination is series resonant for energization at the frequency of source 10. The current flowing through the series circuit is therefore in phase with the voltage between terminals 50 and 51, and since the voltage drop across winding 43 lags the current through the winding by 90°, the voltage drop across the field winding also lags the standard voltage by 90°. Field winding 43 is continuously energized as is shown in the diagram and any change in the voltage output from transformer 12 is transmitted to field winding 43 just as it is to load 11 and regulator 14.

Primary winding 66 of transformer 16 is energized from the output of transformer 12, and the amplitude of the voltage made available by transformer action in secondary winding 67 varies with change in the output of transformer 12. By the familiar full-wave rectification process, a voltage is derived from rectifier 15 which is unidirectional in nature and variable in magnitude according to the well known full wave outline.

This voltage also varies with variation in the voltage supplied to primary winding 66, and accordingly a variable pulsating voltage is supplied to filters 17 and 20: the pulsations in this voltage, however, are first considerably smoothed out by the action of capacitor 93. Filter 17 still further smooths out the wave form, and a substantially constant unidirectional voltage is impressed across voltage divider 114. The magnitude of the voltage impressed across divider 114 varies with change in the amplitude of the voltage energizing transformer primary 66, but due to the familiar action of the voltage regulator tubes shown at 18 the voltage between conductor 120 and conductor 92 remains constant for variation within certain practical limits of the energization of the primary winding of the transformer.

The same voltage that is supplied to filter 17 is also supplied to filter 20, and the output of filter 20 is impressed across the voltage divider including resistors 122 and 124. Of this voltage, any desired portion determined by the position of slider 125 appears between the slider and conductor 92, but the magnitude of this voltage varies with the amplitude of the voltage energizing of primary winding 66, rather than being constant, as is the voltage between conductors 120 and 92.

It will be apparent that for any particular setting of slider 125 there is a particular value of voltage applied to primary winding 66 which brings about a condition of equality between the outputs of the two voltage dividers referred to. The further downwardly along winding 124 slider 125 is displaced, the greater is the voltage that is required to be applied to transformer to insure that the voltage between conductor 92 and slider 125 has the desired equivalent value. Similarly, the further upward slider 125 is displaced along winding 124, the smaller is the voltage applied to primary winding 66 that is required to bring about the desired condition of equivalents. It will, of course, be understood that there are certain limits to the ability of regulator 18 to maintain a constant voltage output regardless of the input energization of the voltage divider, and any system involving our invention must be so designed as to operate within these limits.

When the condition of voltage equivalence has been attained, slider 125 is at the same potential with respect to conductor 92 as is conductor 120, and since grids 134 and 137 are connected thereto, the grids are at the same potential compared with conductor 92. By the use of equal resistors 147 and 150, the potential of cathodes 135 and 140 is maintained half way between that of grid 134 and grid 137 whenever a potential difference appears between the two grids. In this respect, the potential of the cathodes differs from the potential of conductor 92, since it is only at the condition of balance that the voltage drop across the regulator tubes is equal to the voltage drop between slider 125 and conductor 92.

As previously pointed out, the cathodes of triodes 130 and 131 are grounded, and the center tap of secondary winding 70 is also grounded. Due to capacity coupling between secondary winding 70 and secondary winding 67, the entire rectifier-filter circuit, and thus the grids of the triodes, would be free to float at some potential with respect to the cathode which would be determined by the magnitude of the capacity coupling. To avoid this, conductor 92 is connected with conductor 145 through capacitor 151, which accordingly cooperates with capacitors 105 and 95 to shunt around the grids any alternating potentials with respect to ground which are transmitted due to capacity coupling in the transformer.

The anodes 133 and 136 of triodes 130 and 131 are energized in 180° phase relationship from winding 70 of transformer 66. So long as the voltage output of transformer 12 is maintained at the desired value, the voltage drop across the regulator 18 is equal to that between slider 125 and conductor 92, and the grids 134 and 137 are at the same potential. Then for a particular half cycle of source 10 when plate 133 of triode 130 is negative, the voltage between the plate and the cathode follows the output of the upper half of secondary winding 73 in magnitude. During this half cycle the voltage between the plate and cathode of triode 131 is of the opposite polarity, however, and plate current flows in the anode circuit of the triode, thus reducing the plate-to-cathode voltage by the voltage drop in the plate resistance so that it does not follow the voltage outline of the lower half of secondary winding 70. The voltage relations of the two triodes are reversed in the ensuing half cycle of the source, and equal plate currents result in sequential equal voltage drops in the two equal plate resistors. The tube voltages are added in opposition by resistors 193 and 194 in conventional full-wave rectifier position, and the resulting voltage impressed on the input of discriminator stage 22 has a principal component whose frequency is twice that of the source, and no component having the frequency of the source.

If the voltage drop between conductors 120 and 92 is not equal to that between conductors 126 and 92, grids 134 and 137 are no longer at the same potential, one being above and the other being below the cathode potential which is maintained midway between the grid potentials by resistors 143 and 144. The voltage drops in the plate resistors are no longer equal, and the voltage resulting from adding the two voltages now has a component of the frequency of the source. This component is in phase with the source if the voltage supplied to the load is too low and out of phase if the voltage is too high.

Plates 165 and 171 of discriminator stage 22 are energized in 180 degrees phase relation from secondary winding 184 of transformer 164. If the voltage just described is in phase with the source, the grid and plate voltages of triode 161 are in phase, and this triode discharges during first alternate half cycles of the source: the discharge circuit starting from the right hand terminal of winding 184 and including conductor 191, plate 165, cathode 70, junction point 175, conductors 179 and 200, terminal 64, conductor 68, terminal 46, condenser 45 and winding 44 of motor 13, terminal 47, conductor 69, terminal 65 and conductor 197 to center tap 185. If the voltage is out of phase with the source, the grid and plate voltages of triode 162 are in phase, and this triode discharges during second alternate half cycles of the source: the discharge circuit starting from the left hand terminal of winding 184 and including conductor 192, plate 171, cathode 174, junction point 175, conductors 179 and 200, terminal 64, conductor 46, condenser 45 and winding 44 of motor 13, terminal 47, conductor 69, terminal 65, and conductor 197 to center tap 185. Discharge of triode 161 is effective to energize winding 44 of motor 13 with voltage having a component in phase with the source, causing this motor to operate in a forward direction to increase the voltage output of the transformer. Discharge of triode 162 is effective to energize winding 44 of motor 13 with voltage having a component out of phase with the source, causing the motor to operate in a reverse direction to decrease the voltage output of the transformer.

Since the plates of the discriminator tubes are energized at the frequency of the source, the effect of a voltage of double the frequency is equal upon both the discriminator tubes and results in no effective energization of the motor.

In brief, increase of the voltage delivered to the load above a predetermined value, which is set by adjustment of slider 125, causes the unregulated voltage of filter 20 to exceed the regulated voltage of filter 18, causing the potential of grid 134 to exceed that of grid 137. A voltage out of phase with the source is impressed upon the grids of the discriminator tubes, actuating motor 13 to operate in the reverse direction, adjusting transformer 12 to decrease its output voltage. Decrease of the voltage delivered to the load below its predetermined level causes opposite actuation of the system.

In Figure 2 is shown a fragmentary view of the circuit of Figure 1 modified so that the system is responsive to changes in current rather than changes in voltage. A resistor 300 is connected in series with the load, and the voltage drop across this resistor actuates the system just as described above.

Numerous objects and advantages of my invention have been set forth in the foregoing description, together with details of the structure and function of the invention, and the novel features thereof are pointed out in the appended claims. The disclosure, however, is illustrative only, and we may make changes in detail, especially in matter of shape, size and arrangement of parts, within the principle of the invention, to the full extent indicated by the broad general

We claim as our invention:

1. In a device of the class described, in combination: a source of alternating voltage; an electric load circuit; a control circuit; a variable autotransformer supplying to said circuits a controlled voltage derived from said source; a split phase motor actuating said autotransformer to vary the amplitude of said controlled voltage; means energizing one of the field windings of said motor from the load side of said autotransformer; and means, independent of said load circuit, energizing the other field winding of said motor in accordance with deviation of the voltage supplied by said autotransformer from a predetermined value; said last named means including a pair of rectifiers; transformer means energizing said rectifiers, in 180 degree phase relationship, with voltage supplied by said autotransformer; a complex electrical network connected to said rectifiers and including means regulating a portion of the output of said rectifiers to comprise voltage comparison means; a pair of grid controlled rectifiers; means connecting said complex electrical network to said grid controlled rectifiers; means energizing said grid controlled rectifiers from said transformer; an electronic phase discriminator stage; means energizing said discriminator stage from said autotransformer; means connecting the outputs of said grid controlled rectifiers in opposition to comprise an input signal for said discriminator stage; and means continuously energizing the second field winding of said motor from the output of said discriminator stage.

2. In combination, a source of power, said source being subject to voltage variation, rectifying means having input and output terminals, transformer means energized from said source of power, means connecting said transformer to the input terminals of said rectifying means, a voltage comparison network having voltage input and output terminals, said output terminals having a voltage thereon subject to reversal in polarity upon a change in magnitude of the voltage on said input terminals, means connecting the output terminals of said rectifying means to the input terminals of said comparison means, a pair of grid controlled rectifiers each having anodes, cathodes, and control electrodes, means including said transformer for energizing the anode circuits of each of said last named rectifiers on alternate half cycles of said source of power, means connecting the output terminals of said voltage comparison network to the control electrodes of said last named rectifiers to variably bias said rectifiers in accordance with the voltage on the output terminals of said comparison network, alternating current output coupling means common to the anode circuits of said last named rectifiers, and alternating current driven electronic amplifying and discriminating means biased by said coupling means, said amplifying means having an output whose frequency is the same as said source of power and whose phase is dependent upon the variations in voltage of said source of power.

3. In combination, adjustable voltage control means having input and output terminals, electronic detecting means continuously energized by said control means and variably responding to the voltage on the output terminals of said control means, said electronic detecting means comprising a first pair of opposed amplifier tubes and a second pair of opposed amplifier tubes, an alternating current source of supply voltage on the output terminals of said control means and comprising center tapped transformer windings, means connecting said opposed amplifiers to be oppositely energized by said windings, motor means having a pair of energizing windings, means connecting one of said pair of windings of said motor means directly to the output terminals of said control means, means connecting the other pair of windings of said motor means continuously to said second pair of opposed amplifier tubes for variable energization in accordance with the response of said detecting means to the voltage of said control means, and coupling means connecting said motor means to said control means.

NILS N. GEORGE.
RAYMOND V. KLINE.

REFERENCES CITED

The following references are of record in the file of this patent:

UNITED STATES PATENTS

| Number | Name | Date |
|---|---|---|
| 2,239,768 | Artzt | Apr. 29, 1941 |
| 2,302,889 | Reed | Nov. 24, 1942 |
| 2,343,116 | Ryder et al. | Feb. 29, 1944 |
| 2,368,582 | Sziklai | Jan. 30, 1945 |
| 2,423,540 | Wills | July 8, 1947 |